July 28, 1942.  A. J. HAZLE, JR  2,291,038
COFFEE GRANULATOR
Filed July 15, 1939  2 Sheets-Sheet 1
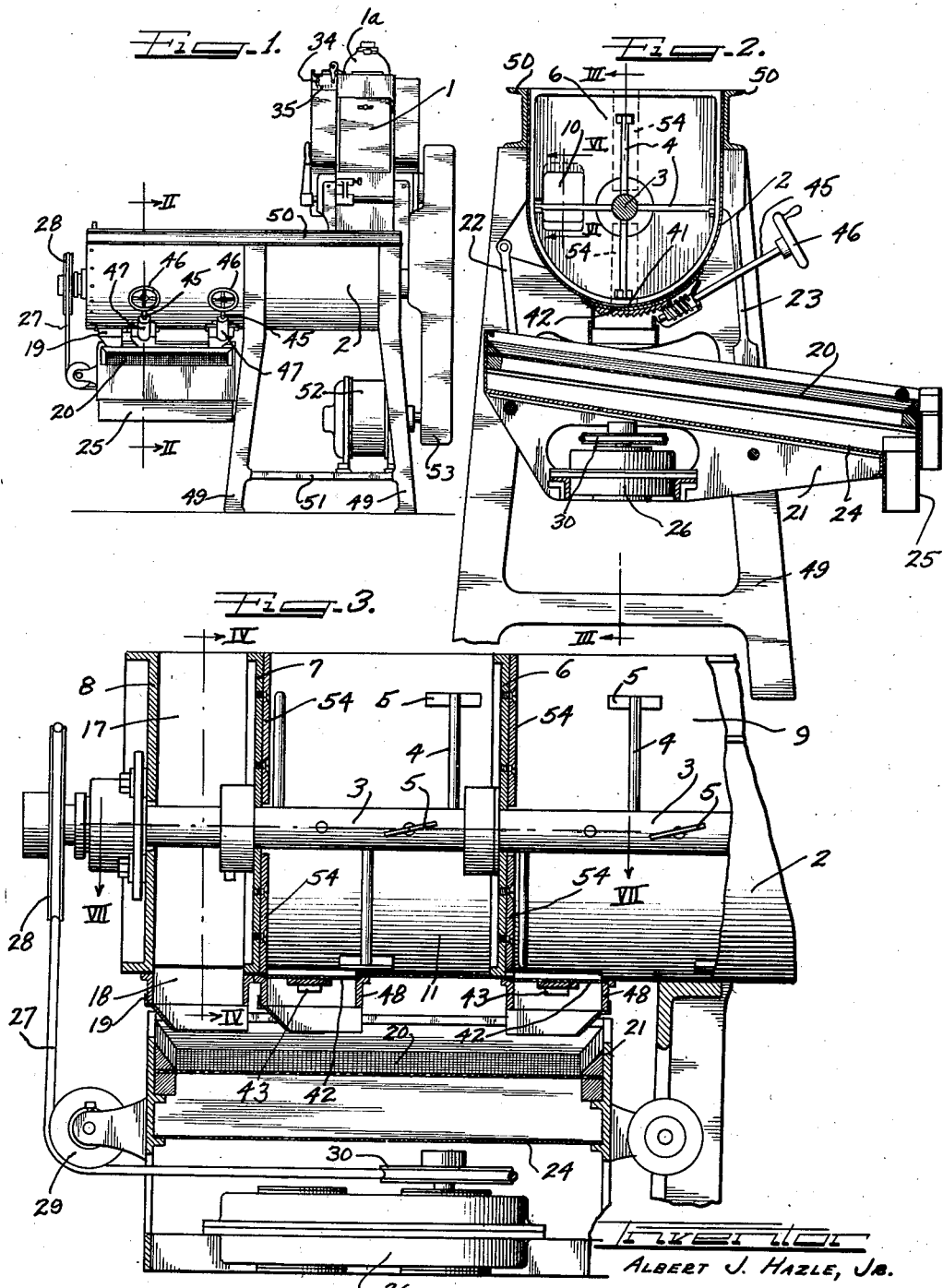
Inventor
ALBERT J. HAZLE, JR.

July 28, 1942.　　A. J. HAZLE, JR　　2,291,038
COFFEE GRANULATOR
Filed July 15, 1939　　2 Sheets-Sheet 2
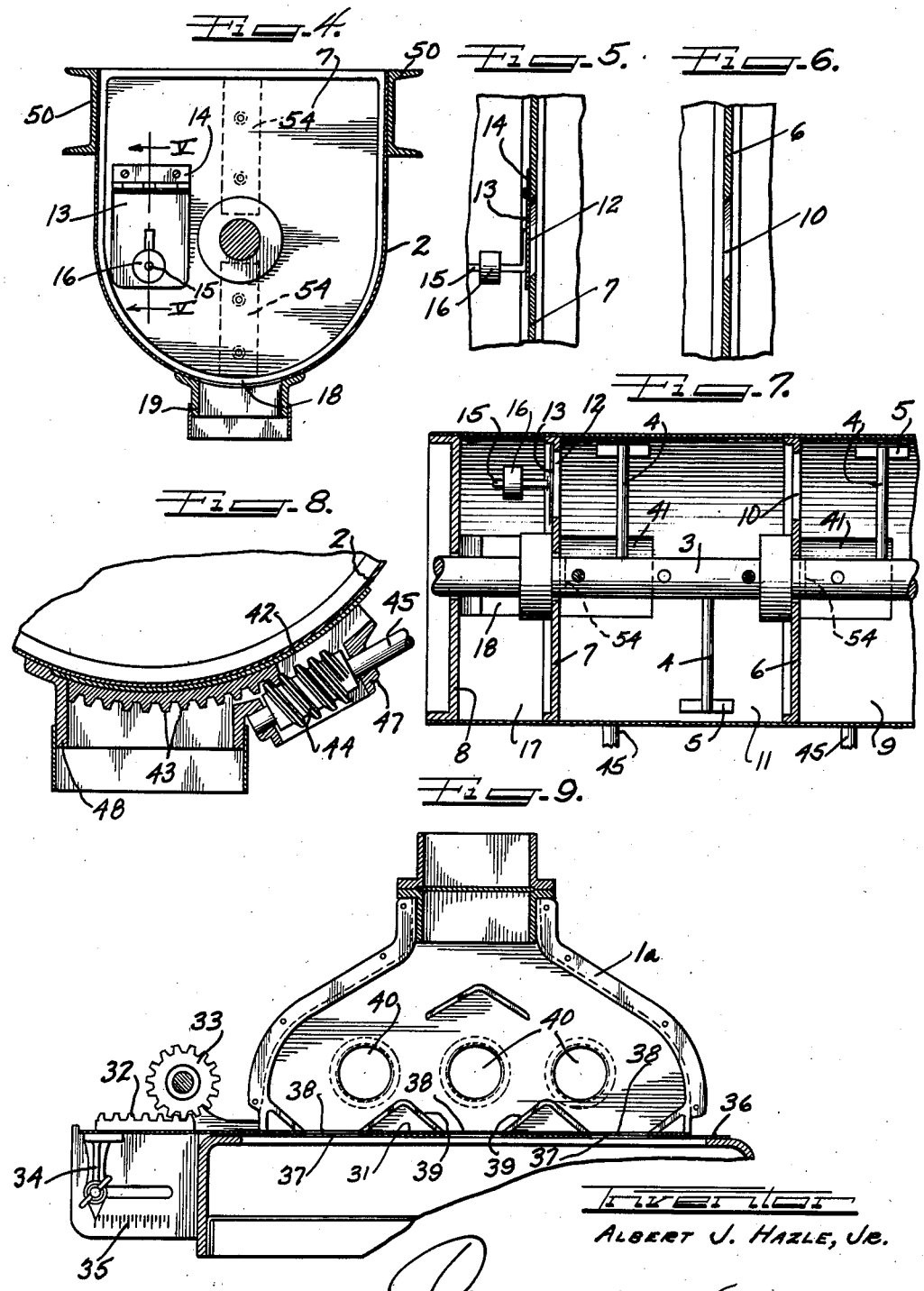
Inventor
ALBERT J. HAZLE, JR.

Patented July 28, 1942

2,291,038

UNITED STATES PATENT OFFICE 2,291,038

COFFEE GRANULATOR

Albert J. Hazle, Jr., Chicago, Ill., assignor to B. F. Gump Co., Chicago, Ill., a corporation of Illinois Application July 15, 1939, Serial No. 284,673

3 Claims. (Cl. 83—18)

This invention relates to a coffee granulator and constitutes a continuation in part of my copending application Serial No. 664,546, filed April 5, 1933, and embodying improvements upon the coffee granulator disclosed in my U. S. Letters Patent No. 2,204,591, granted June 18, 1940.

In the above identified earlier application there is disclosed a coffee granulator involving a new principle in the treatment of the granulated coffee as it leaves the granulating rolls. This new principle involves a rapid whipping or scouring action of the granulated mass. The present invention concerns itself with an improved structure whereby the speed of the machine may be reduced without affecting the result attained in the previous machine and whereby the frictional working during treatment of the product is also reduced.

More specifically, in the present invention the foregoing advantages are attained by providing a plurality of partitions which divide the treatment chamber into a plurality of compartments through which the coffee mass composed of coffee particles and liberated chaff is successively conducted. It has been discovered that these partitions act to throw back the chaff upon the mass being agitated in each compartment, thus enabling the agitating means to be operated at a slower speed and the prolonging of the extent of agitation to which the chaff and particles of coffee are subjected. With this arrangement the coffee is not overworked by the ensuing friction and consequently does not affect the quality, and change the color of the coffee.

Where it has been customary previously in machines of this type to operate the agitating means at a speed of approximately 600 R. P. M., machines embodying the features of the present invention may operate the agitating means at a materially reduced speed within a range of approximately 400 R. P. M. to 450 R. P. M., without causing undue frictional working of the coffee.

In certain types of the higher quality coffees it has been found that the chaff is of a greater proportion and more difficult to comminute and conceal in the coffee particles. In the present invention this difficulty has been successfully overcome by providing one or more ribs or slats on the forward wall of each partition in the treating chamber. These ribs or slats in each compartment cooperate with the agitating means therein to produce an additional rubbing action between the particles of coffee, which is sufficient to cause comminution and concealment of the chaff particles, especially when treating the higher quality grades of coffee. Due to the relatively slower speed of operation of the agitating means, the comminution of the chaff may thus be augmented, while retaining the additional advantages of being able to maintain the frictional working of the coffee mass at such value as to not affect the quality, flavor and color of the coffee.

Other improvements reside in various features such as the novel means for cleaning out the machine, the means for scalping the finished product, and the means for spreading the coffee beans at the granulating rolls.

The invention comprises the novel structure and combinations of parts hereinafter described and more particularly pointed out and defined in the appended claims.

In the accompanying drawings which illustrate a preferred form of this invention and in which similar reference numerals refer to similar features in the different views:

Fig. 1 is a side elevational view of a coffee granulator involving this invention.

Fig. 2 is an enlarged sectional view taken upon the line II—II of Fig. 1 looking in the direction of the arrows.

Fig. 3 is an enlarged fragmentary sectional view taken upon the line III—III of Fig. 2.

Fig. 4 is an enlarged sectional view taken upon the line IV—IV of Fig. 3 looking in the direction of the arrows.

Fig. 5 is an enlarged fragmentary sectional view taken upon the line V—V of Fig. 4.

Fig. 6 is an enlarged fragmentary sectional view taken upon the line VI—VI of Fig. 2.

Fig. 7 is an enlarged fragmentary sectional view taken upon the line VII—VII of Fig. 3.

Fig. 8 is an enlarged fragmentary sectional view of a certain feature of construction.

Fig. 9 is a part sectional and part elevational view of a feed hopper illustrating the coffee bean distributing means.

In the drawings there is illustrated a coffee granulator comprising a mill generally denoted by the reference numeral 1 which is supported upon the top of a relatively long trough-like casing 2 having a concave bottom portion. The mill is entirely enclosed so that the cracking and granulating operations are not exposed to the atmosphere. A shaft 3 is journaled in the casing and slender whipping elements 4 in staggered relation are arranged upon the shaft 3. These whipping elements have terminal blades 5 which are directed at an angle to cause the granulated mass to move rearwardly.

According to this invention, the casing is divided into a plurality of compartments by means of partitions 6 and 7. The ends of the casing are of course closed by suitable end closures 8 only one of which is shown to produce an enclosed chamber. The top of the casing, as shown in Figures 1 and 2, is flat and, as shown in elevation in Figure 1, is provided with a suitable removable cover having a handle 8' projecting upwardly from the left hand end of the casing illustrated in Figure 1; the casing being shown with the cover removed in Figures 2, 3, and 4. The granulated mass including the coffee chaff falls into the first compartment designated by the reference 9. The rear end of this compartment 9 is formed by the partition 6 having an opening 10 (Fig. 2) located above the bottom so that an accumulation of the granulated mass will occur in said compartment for receiving a whipping action.

As the whipped granulated mass rises, it will escape through the opening 10 and drop into the compartment 11 formed between the partitions 6 and 7. The partition 7 is provided with an elevated outlet opening 12 (Fig. 7) to cause an accumulation of the partly whipped granulated mass to occur in said compartment for a second whipping or scouring action. The outlet opening 12 is closed by a gate or door 13 which is hinged at its upper end to a strip 14 (Fig. 4) secured to the partition 7. A rod 15 attached to the gate extends rearwardly thereof and adjustably supports a counterweight 16 that normally tends to maintain the door in closed position. The pressure of the granulated mass in the compartment 11 acting upon the door will automatically open the same for the escape of the finished product which falls into an outlet compartment 17 between the partition 7 and the end closure 8. The outlet compartment 17 has a discharge opening 18 in its bottom portion.

A spout or nozzle 19 attached to the bottom of the outlet compartment in registry with the discharge opening, guides the finished product upon a scalping screen 20 (Figures 1, 2, and 3) in order to remove the coarse particles, strings and sticks from the finished product. The coffee bean is shipped in bags and a certain amount of white strings or fibres from the bag is usually present and proves objectionable unless removed by the scalping screen.

The scalping screen 20 is supported in a casing generally denoted by the reference numeral 21 which may be sustained from the casing by suitable hangers 22 and 23 (Fig. 2). The finished product passing through the screen falls upon an inclined floor or chute 24 having a discharge spout 25 at its lower end which preferably extends thereacross.

Below the chute 24, there is supported a centrifugal device 26 driven by a belt 27 from the shaft 3. To this end, the shaft 2 supports a pulley 28 upon its outer end around which the belt is trained. A guide pulley 29 guides the belt into the casing 21 and around a pulley 30 on the shaft of the centrifugal agitator 26. This agitator is adapted to shake or vibrate the scalping screen.

The granulating mill 1 may be similar to the one disclosed in my copending application above mentioned. It, however, possesses an added feature in the form of a coffee bean distributor 31 (Fig. 9) which extends outwardly beyond the inlet hopper 1a of the mill where it is provided with rack teeth 32 meshing with a rotatable pinion 33 the operation of which will slide the distributer outwardly or inwardly as desired. A pointer 34 on the distributer cooperates with a scale 35 secured to the mill casing for indicating the adjustment of the distributer.

Below the distributer 31 and at the bottom of the hopper there is a plate 36 provided with a plurality of slots 37. The distributer 31 which is also in the form of a plate has slots 38 that may be brought into registry with the slots 37 or in partial registry therewith. Between the slots 38 in the distributer are convex ribs 39 which deflect the coffee beans into the slots. Thus the distribution of the coffee beans and the feeding thereof to the granulating rolls which are located below the hopper are controlled, since the adjustment of the distributer will partially close or open wider the slots 37. In order to watch the distribution of coffee in the hopper 1a, the same may be provided with sight openings 40.

When the coffee granulator is shut down after an operating period, it may be desirable to clean the compartments 9 and 11. To this end, an opening 41 (Fig. 7) is formed in the bottom of each compartment and each opening 41 is normally closed by an arcuate slide gate 42 having rack teeth 43 thereon. A worm 44 meshes with the rack teeth of each slide gate 42. These worms are secured upon shafts 45 equipped with hand wheels 46 at their upper ends as shown in Fig. 1. Suitable bearings 47 are provided upon the casing 2 for the worms 44 and shafts 45. By operating the shafts 45 the slide gates may be opened for removing the granulated coffee in the compartments. This coffee will drop upon the scalping screen and find its way to the finished product. Then by reversing the operation of the shafts 45, the slide gates may be moved to closed position. A suitable spout 48 is preferably attached in registry with each opening 41.

The apparatus herein described may be supported upon suitable leg frames 49 to which channel members 50 are attached that extend coextensive with the casing 2 which is attached thereto. The supporting frame has a platform 51 for supporting a motor 52 for operating the mill and shaft 3, the driving connection being concealed in a hood 53.

It will be appreciated that in the provision of a plurality of compartments, the granulated mass and chaff may be subjected to several successive whipping or scouring actions for completely comminuting the chaff and blending the same in the finished product and that due to these several actions it is possible to materially reduce the speed of the agitating shaft over the speed of the shaft operating in a single compartment as disclosed in my copending application. In the present instance, the agitating shaft requires a rotation of only approximately 400 R. P. M. This reduction of the speed of the agitating shaft also reduces the frictional working of the finished product over similar machines having a higher rate of speed of the agitating shafts and this is a very desirable advantage.

In the treatment of certain grades of coffee, it has been found that the chaff is exceedingly tough and does not readily respond to comminution and concealment in the coffee mass. In the present invention, this difficulty has been successfully overcome by the provision of means for augmenting the interparticle rubbing action between the coffee particles in each compartment sufficiently to result in the comminution and concealment of these tougher chaff particles.

For such purpose, the partitions 6 and 7 are provided on their forward surfaces with one or more ribs or slats 54, as shown in Figures 2, 3 and 4. While these ribs may be variously arranged, in the present instance they are disclosed as being secured so as to radiate outwardly from the shaft 3 over the surface of the partition with which they are associated.

With this arrangement, as the coffee mass is accumulated at the rear end of each compartment, the ribs on the partition act to restrain the chaff and coffee particles adjacent the partition against any rotary movement which might tend to be imparted to them by the action of the adjacently disposed whipping elements.

Since the particles being acted upon by the whipping elements have a more or less rotational movement imparted to them, the ribs and adjacent whipping elements cooperate to set up additional interparticle movements between the coffee particles at the outlet ends of the compartments, which are effective to further comminute and conceal the tougher chaff particles in the coffee mass, which have not been previously completely comminuted by the action of the whipping elements before the coffee particles reach the outlet end of a compartment.

The utilization of the foregoing additional comminuting action is primarily possible in the present instance because of the relatively slower speed of operation of the agitating means, which enables the elimination of excessive frictional working of the coffee mass to such an extent as to not affect the quality, flavor, and color of the coffee.

I am aware that many changes may be made and numerous details of construction may be varied through a wide range without departing from the principles of this invention, and I, therefore, do not purpose limiting the patent granted hereon otherwise than necessitated by the scope and spirit of the appended claims.

I claim as my invention:

1. In an apparatus for preparing coffee which has been reduced in a mill to a coffee mass comprising granules and substantial particles of light chaff a mixing casing having a substantially imperforate bottom which is transversely circular throughout substantially half of its cross section and having a flat top section, said casing also having at one end an inlet opening adapted to be completely closed by a coffee reducing mill disposed thereover and having a discharge opening at its other end, and rotating means including a plurality of beating elements all of which rotate in unison in said casing for beating and advancing coffee discharged therein from said inlet, along the under side of said top section, toward said discharge opening, said rotating means having a rotary path the top of which is spaced from the top of said casing so that a chaff beating and abrading zone is provided between the flat top section and said rotary path into which said particles of liberated light chaff are adapted to be centrifugally thrown from said rotary path against said flat top section and to be subjected to the abrading action of the mass of coffee granules as such coffee mass is whirled through said path and past said zone, whereby said chaff is comminuted and rendered substantially invisible in the ensuing treated mass, while preserving the granular form of the coffee, said casing being divided into a plurality of longitudinal compartments by vertical partition means having an opening located above the bottom of said casing whereby the coffee mass being treated may be progressively advanced through said opening from one compartment to the next by said beating elements, said partition means including projecting means on a face thereof and extending into said one compartment for opposing movement of the coffee mass by said elements and against which coffee particles comprising chaff are adapted to collect and to be abraded by the whirling coffee mass, said elements being of such configuration and arrangement as to aid in abrading the chaff without grinding up the coffee particles.

2. In an apparatus for preparing coffee that has been broken up into coffee particles of relatively uniform size as well as into particles of chaff, a mixing and chaff comminuting chamber, means for propelling and beating the coffee mass in a continuous stream along a given path of substantial length in said chamber longitudinally to the axis of the chamber as well as for simultaneously causing said stream to flow centrifugally about said axis while being subjected to a beating action, said chamber having means for breaking up and interrupting the centrifugal flow along the periphery of said stream through a substantial portion of the length of said path to cause relative movement between the coffee particles and liberated chaff at the place of interruption so as to subject the particles of chaff to such an abrading action by the rotating coffee particles as to reduce and commingle the chaff with the coffee particles, and partition means dividing said chamber into a plurality of interconnected compartments and provided with additional interrupting means for cooperating in the abrading of the liberated chaff by the coffee particles, said interrupting means being of such construction and arrangement as to aid in comminuting the chaff without grinding up the coffee particles.

3. In an apparatus for preparing coffee that has been broken up into coffee particles of relatively uniform size as well as into particles of chaff, a mixing and chaff comminuting chamber, means for propelling and beating the coffee mass in a continuous stream along a given path of substantial length in said chamber longitudinally to the axis of the chamber as well as for simultaneously causing said stream to flow centrifugally about said axis while being subjected to a beating action, said chamber having means for breaking up and interrupting the centrifugal flow along the periphery of said stream through a substantial portion of the length of said path to cause relative movement between the coffee particles and liberated chaff at the place of interruption so as to subject the particles of chaff to such an abrading action by the rotating coffee particles as to reduce and commingle the chaff with the coffee particles and partition means dividing said chamber into a plurality of interconnected compartments and provided with additional interrupting means for cooperating in the abrading of the liberated chaff by the coffee particles, said additional interrupting means comprising a projection extending into one of the compartments adjacent its discharge connection to an adjoining compartment, and said propelling and beating means being operated within a speed range of approximately 400 to 450 R. P. M.

ALBERT J. HAZLE, JR.